Patented July 11, 1939

2,165,506

UNITED STATES PATENT OFFICE 2,165,506

METHOD OF MAKING A COMPOSITE FABRIC

Herbert Platt, Cumberland, Md., and Arthur Bruce Snowdon, Hilldale, N. J., assignors to Celanese Corporation of America, a corporation of Delaware No Drawing. Application February 25, 1937, Serial No. 127,774

6 Claims. (Cl. 154—2)

This invention relates to the preparation of stiffened fabrics and also to wearing apparel or other technical or commercial articles formed in whole or in part of such stiffened fabrics. This invention relates particularly to the layer of fabric, and to the method of making same, that is adapted to be coalesced for the purpose of imparting a stiffened effect to a laminated or composite fabric.

An object of this invention is to prepare fabrics of any desired degree of increased stiffness by effecting the coalescence of two or more layers of fabric, at least one of which contains at least some yarns, filaments or fibres of an organic derivative of cellulose and a plasticizer therefor. Another object of this invention is to prepare the layers of fabric containing the yarns, filaments or fibres of an organic derivative of cellulose and a plasticizer therefor in such a manner that it may be easily handled and stored and has enhanced binding power or adhesion when employed in a composite fabric. Other objects of the invention will appear from the following detailed description.

In processes for making stiffened fabric by causing plasticized cellulose acetate or other organic derivatives of cellulose to melt or coalesce and effect a lamination of two or more fabrics by operations involving the application of heat and pressure, there have been variations in the uniformity of adhesion between the layers of fabric. Furthermore, it was found that fabric containing the organic derivative of cellulose and plasticizer was coalesced while still in the roll or bolt form as it comes from the manufacturer, i. e., prior to use in building up the composite fabric. We have now found a new process for preparing a fabric containing cellulose acetate or other organic derivative of cellulose and plasticizer therefor, which fabric for the purpose of this invention is termed "laminating fabric". The laminating fabric processed in accordance with this invention effects a uniform adhesion of the layers of the composite fabric and does not coalesce or become excessively tacky when in the roll or bolt. We have also found that laminated fabric formed in accordance with this invention effects a better adhesion of the layers of fabric in the composite article as evidenced by laundering tests, tests by direct pull in attempt at separation, etc.

Laminating fabric for collars of proven value as regards adhesion and consequent washing tests showed a definite fault inasmuch as this fabric when shipped in roll or bolt form showed a stickiness such that the fabric in the various layers stuck to one another to such an extent that under temperatures of summer heat the layers were almost impossible of separation and the roll or bolt became almost a solid mass. Attempts to eliminate excessive stickiness in the roll and yet secure sufficient adhesion such that the wash tests would be satisfactory for service under normal conditions presented a great problem. It was the common practice to apply the plasticizer to the laminating fabric in the presence of volatile liquids. If the volatile liquids were left in or on the laminating fabric, the same became very tacky and sticky to such an extent that it could not be handled in cutting and sewing operations. By driving off these volatile liquids by heat or steam, enhanced results were obtained so far as stickiness was concerned, but this had a tendency to lower the adhesive properties of the laminating fabric. We have found that if the laminating fabric was allowed to age, a substantial migration of the plasticizer occurred accompanied by a remarkable change in the properties of the fabric. This conversion of the fabric by ageing greatly improves its adhesive properties. In this conversion step where the fabric treated contains non-thermoplastic as well as organic derivative of cellulose yarns, filaments or fibres, a substantial amount of the plasticizer migrates from the non-thermoplastic component of the fabric to the organic derivative of cellulose component, thus placing the plasticizer in only that constituent of the fabric where it is of value. There is also a further result obtained by the conversion step; that is, the ageing of the fabric in the presence of the plasticizer effects a change in the organic derivative of cellulose, the ultimate results of which are to produce a better adhesion when the fabric is used in forming the composite fabrics, and there is less tendency of the plasticizer with or without some of the organic derivative of cellulose from sweating through the other layers of the composite article during the heat and pressure operations employed in effecting the lamination.

Laminating fabric having an adhesion of ½ lb. on the right side and 1 lb. on the reverse side when freshly prepared, if treated in accordance with this invention, develops after 66 hours of conversion by ageing, an adhesion of 1¼ lbs. on the right side and 1½ lbs. on the reverse side. This invention is also of importance from an economical standpoint as it effects a great saving of applied plasticizer. For instance, exceptionally good laminating fabric may now be made containing from 30% to 40% of plasticizer where it was formerly necessary to apply 40% to 50% of plasticizer. These figures are given as illustrations only and are not intended as limitations as the amount of plasticizer employed will vary greatly depending upon the ratio of the organic derivative of cellulose to non-thermoplastic material in the laminating fabric and upon the use to be made of the laminating fabric. By employing this invention, substantially the whole amount of plasticizer is in the organic derivative of cellulose component of the laminating fabric and therefore just that amount of plasticizer necessary to effect good adhesion need be applied. By applying this limited amount of plasticizer and effecting a conversion of the organic derivative of cellulose, a laminating fabric is produced that has good adhesive properties and yet has much less tendency to weld or coalesce into a solid tube when in roll form.

In accordance with this invention, we prepare laminating fabric containing an organic derivative of cellulose, a plasticizer therefor and non-thermoplastic material, adapted to be employed as the laminating layer of a laminated or composite fabric. The purpose of the laminating fabric is to effect an adhesion between the layers of fabric in the laminated or composite fabric. This laminating fabric we prepare by applying a plasticizer for the organic derivative of cellulose to a fabric containing an organic derivative of cellulose and a non-thermoplastic material such as cotton, regenerated or reconstituted cellulose, silk, wool, linen, etc., and then effecting a conversion of the fabric in such a manner that a substantial proportion of the plasticizer migrates from the non-thermoplastic portion of the fabric to the organic derivative of cellulose portion of the fabric. There is also a conversion of the organic derivative of cellulose by penetration of the plasticizer. This conversion of the lamination fabric may be effected by ageing in open widths on racks, while loosely wound on rolls while not in a compact mass wherein one layer of fabric is pressed tightly against another. Fabric may also be aged when rolled in a normal manner preferably re-rolling the same after the ageing treatment. To reduce the time required to properly convert the laminating fabric, the said fabric may be aged at elevated temperatures of from 30° C. to 70° C. in heated chambers. It is preferable to convert laminating fabric, by ageing the same at a temperature of about 40° C. to 50° C.

The laminating fabric may be formed by weaving, knitting, knotting, netting yarns or filaments of an organic derivative of cellulose with yarns or filaments of nonthermoplastic materials into a fabric. The production of the fabric is preferably effected in such a manner that there is a uniform dispersion of yarn or filaments of organic derivative of cellulose with the yarns or filaments of the other type. Where the laminating fabric is formed by weaving or knitting yarns containing cellulose acetate or other organic derivative of cellulose with a textile yarn such as cotton, regenerated cellulose, linen, etc., it is preferable to so weave the yarns of cellulose acetate or other organic derivative of cellulose that they form floats on the surface of the fabric. In such a fabric the structure of the cellulose acetate or other organic derivative of cellulose yarns may be partially or substantially destroyed in the coalescing action without materially weakening the fabric, as they are contained in the fabric only as floats and not as a part of the fundamental structure thereof. The cellulose acetate or other organic derivative of cellulose yarns may be woven to alternate in the warp or in the weft or both in any desired degree of alternation with the yarns of non-thermoplastic fibres. This alternation may be, for instance, 1, 2, 3 or more cellulose acetate yarns, with one, 2 or 3 or more cotton or other non-thermoplastic yarns. For convenience the warp may be made of such alternation of cellulose acetate yarn and yarn of other fibres, while the weft may consist wholly of such cellulose acetate yarn or wholly of yarn of other fibers. However, the weft may consist of an alternation of such cellulose acetate yarns and non-thermoplastic yarns of other fibers. However, where the fabric is made in ordinary looms the alternation may be used in which either warp or weft consists wholly of cellulose acetate yarn while the other component consists of non-thermoplastic yarns.

The laminating fabric may also be formed of non-thermoplastic yarns and then have applied thereto an organic derivative of cellulose powder, film or coating. Furthermore a part or all the yarns of the fabric may be formed of a mixture of an organic derivative of cellulose fibers or filaments mixed with non-thermoplastic fibers or filaments. Although this invention is of particular importance in the production of laminating fabric containing both organic derivative of cellulose material and non-thermoplastic material the ageing treatment may also be applied to laminating fabrics made wholly of organic derivatives of cellulose yarns to effect a conversion of same or a penetration of the plasticizer.

In order to increase the opacity of the final product or to impart special color effects thereto the filaments or fibers or organic derivatives of cellulose may have incorporated therewith finely divided pigments such as titanium dioxide or antimony trioxide or other like pigments. These pigments may be incorporated in the organic derivative of cellulose fibers or filaments by adding the same to the spinning solution from which they are formed.

Laminating fabric may be impregnated with plasticizer in any suitable manner. For instance, the plasticizer may be applied to the laminating fabric by dipping the fabric in a bath of the plasticizer, passing the fabric through nip rollers to remove excess plasticizer and removing the volatile liquids, if any, by heat. Laminating fabric may also have the plasticizer applied thereto by spraying the fabric with the plasticizer, emulsions containing plasticizer or solutions containing plasticizer. Continuous methods of applying the plasticizer are preferable and this is usually accomplished by drawing the fabric through a bath containing the plasticizer dissolved in a volatile liquid, removing excess liquids by nip rollers, doctor blades, etc., and then passing the fabrics through hot chambers to remove the volatile liquids. The volatile liquid employed as a thinner or diluent for the plasticizer preferably has a softening or swelling action on the derivative of cellulose such that the plasticizer is partially penetrated into the fabric at the time of application. If non-softening agents are employed a longer period of conversion must be had to effect a substantially complete migration and penetration of the plasticizer to the organic derivative of cellulose.

Any suitable plasticizer may be employed for the organic derivative of cellulose. For instance, we may employ dibutyl phthalate, diethyl phthalate, dibutyl tartrate, diethyl tartrate, mono-ethyl-para-toluene sulphonamid, mono-methyl xylene sulphonamid, ethyl ether or ethylene glycol, methyl ether of ethylene glycol, dimethoxy ethyl phthalate, triacetin, etc. A preferred plasticizer bath consists of about 58 parts dimethoxy ethyl phthalate, 4 parts triacetin and 40 parts of ethyl alcohol. There may be applied to the laminating fabric a sufficient amount of this mixture of plasticizers such that upon removal of the alcohol there remains on the fabric from 10% to 60% or more of the plasticizer, based on the weight of the fabric. As stated above, the amount of plasticizer applied will depend upon the amount of organic derivative of cellulose in the fabric and the use for which the fabric is intended as well as the particular type of plasticizer employed.

The laminating fabric, after a plasticizer for the organic derivative of cellulose is applied thereto, is converted to the more desirable state by an ageing operation involving the migration of the plasticizer from the non-thermoplastic portion of the fabric to the organic derivative of cellulose portion of the fabric and also effecting a change in the nature of the organic derivative of cellulose. The conversion of the laminating fabric enhances the adhesive properties of the laminating fabric such that it sticks better to outside layers of fabric when the composite article is subjected to heat and pressure. The conversion of the laminating fabric allows it to have this property and still be stored in a condition such that it is not tacky enough nor sticky enough to stick to itself on the roll. This conversion of the laminating fabric is effected by storing the fabric for a period of from 4 to 14 days or longer at room temperature. This time of conversion may be shortened by storing the fabric in a heated chamber maintained at from 30 to 70° C., preferably 40° C. to 50° C.

The relation of time of conversion to adhesion of a sample laminating fabric for a shirt collar is as follows. The fabric is aged at a temperature of about 40° C.

| | Right side | Reverse side |
|---|---|---|
| At once | ½ lb. | 1 lb. |
| After 24 hours | ¾ lb. | 1 lb. |
| After 42 hours | 1 lb. | 1 lb. |
| After 66 hours | 1¼ lbs. | 1½ lbs. |
| After 90 hours | 1¼ lbs. | 1½ lbs. |

The above values indicate the pull necessary to separate the layers.

The relation of time of conversion of the laminating fabric to the plasticizer in the cellulose acetate and in the cotton of a fabric containing 35% cellulose acetate yarns and 65% cotton yarns having an application of 40% plasticizer is as follows:

| | Cellulose acetate | Cotton |
|---|---|---|
| Original | 35% | 65% |
| After 24 hours | 43.8% | 56.2% |
| After 120 hours | 45.2% | 54.8% |
| After 168 hours | 46.5% | 53.4% |

The laminating fabric may be employed in the formation of composite or laminated fabrics which may be used for any purpose where a stiffened and/or relatively impermeable fabric is desired. An important application of such products is wearing apparel which may be formed in whole or in part of fabrics made of or prepared from said laminated or composite fabrics. Thus, collars or cuffs for shirts may be formed entirely of the laminated or composite fabrics. Alternatively, shirts may be made wherein the attached collars, neckbands, cuffs, fronts or bosoms are made of such materials. Hats or parts of hats may likewise be formed of such material as may be the inner or sweat bands of hats, visors for caps, cuffs or gauntlets for gloves, inner linings of cravats, stiffening material used in the inner portion of garments such as coats to help retain the shape thereof, shoes and parts thereof, the head piece of gas masks, etc. Fabrics formed by employing this invention may be used for any industrial or technical purposes where fabric of increased stiffness and/or impermeability is required.

The process of effecting the lamination of the laminating fabric with one or more layers of fabric may be any suitable method as, for instance, the wet method wherein the assembly of superimposed fabrics are wetted with water or steam and then subjected to heat and pressure, the dry method where the assembly of superimposed fabrics are subjected directly to heat and pressure in the absence of liquids, or the solvent method wherein the superimposed layers of fabric are wetted with a liquid or vapor which is a solvent or swelling agent at elevated temperatures for the organic derivative of cellulose. Although any process of effecting the lamination may be employed we prefer to employ a two-step process in which the superimposed articles are first bound together by a dry method of laminating and then the adhesion between the layers is further increased by a wet method of laminating. For instance, the assembly of fabrics bound by the dry method of laminating may be treated with water and then again subjected to heat and pressure. This latter method is more fully disclosed in U. S. application S. No. 106,802 filed October 21, 1936, which has now issued as Patent No. 2,126,830 dated August 16, 1938. The laminating fabric of this invention may be employed in any of the assemblies and in any manner described in said application.

As an illustration but not as a limitation the following example is given.

*Example*

A laminating fabric formed by weaving 35% cellulose acetate yarns with 65% cotton yarns is treated for 4 to 5 seconds in a bath containing about 58 parts dimethoxy ethyl phthalate, about 40 parts of alcohol and about 4 parts of triacetin. The fabric is then passed through nip rollers to remove the excess of the treating bath. Temperature, concentration and time of treatment is so regulated that there is about 38% weight increase of the fabric after passing through hot chambers at 125° C. for 1 to 5 minutes to remove a substantial part of the alcohol. The fabric is then rolled and placed in a warm room maintained at about 40° C. for from 1 to 8 or more days. The fabric is then re-rolled and packaged. The fabric is found not to stick together in the roll and yet produces a strong adhesion between the layers of the laminated fabric after it has been subjected to heat and pressure in the process of laminating.

It is to be understood that the foregoing detailed description is given merely by way of illustration and that many variations may be made therein without departing from the spirit of our invention.

Having described our invention, what we desire to secure by Letters Patent is:

1. In a process for preparing a laminating fabric for adhesively uniting the components in a composite fabric, the steps of applying to a fabric containing yarns of an organic derivative of cellulose and cellulose yarns a plasticizer for the organic derivative of cellulose, and ageing the fabric at a temperature of about 40° C. for a period of from 66 to 90 hours so as to cause the plasticizer to migrate from the celulose yarns to the organic derivative of cellulose yarns.

2. In a process for preparing a laminating fabric for adhesively uniting the components in a composite fabric, the steps of applying to a fabric containing yarns of cellulose acetate and cellulose yarns a plasticizer for the cellulose acetate, and ageing the fabric at a temperature of about 40° C. for a period of from 66 to 90 hours so as to cause the plasticizer to migrate from the cellulose yarns to the cellulose acetate yarns.

3. In a process for preparing a laminating fabric for adhesively uniting the components in a composite fabric, the steps of applying to a fabric containing yarns of an organic derivative of cellulose and cellulose yarns a plasticizer for the organic derivative of cellulose, and ageing the fabric at temperatures from 30° to 70° C. for a period of at least four days so as to cause the plasticizer to migrate from the cellulose yarns to the organic derivative of cellulose yarns.

4. In a process for preparing a laminating fabric for adhesively uniting the components in a composite fabric, the steps of applying to a fabric containing yarns of cellulose acetate and cellulose yarns a plasticizer for the cellulose acetate, and ageing the fabric at temperatures from 30° to 70° C. for a period of at least four days so as to cause the plasticizer to migrate from the cellulose yarns to the cellulose acetate yarns.

5. In a process for preparing a laminating fabric for adhesively uniting the components in a composite fabric, the steps of applying to a fabric containing yarns of an organic derivative of cellulose and cellulose yarns a plasticizer for the organic derivative of cellulose in a volatile solvent, passing the fabric through a chamber heated to a temperature of 125° C. for from one to five minutes to remove a substantial proportion of said volatile liquid, and storing and ageing the fabric at a temperature from 30 to 70° C. for a period of four days so as to cause the plasticizer to migrate from the cellulose yarns to the organic derivative of cellulose yarns.

6. In a process for preparing a laminating fabric for adhesively uniting the components in a composite fabric, the steps of applying to a fabric containing yarns of cellulose acetate and cellulose yarns a plasticizer for the cellulose acetate in a volatile solvent, passing the fabric through a chamber heated to a temperature of 125° C. for from one to five minutes to remove a substantial proportion of said volatile liquid, and storing and ageing the fabric at a temperature from 30 to 70° C. for a period of four days so as to cause the plasticizer to migrate from the cellulose yarns to the cellulose acetate yarns.

HERBERT PLATT.
ARTHUR BRUCE SNOWDON.